United States Patent [19]
Budge

[11] 3,735,737
[45] May 29, 1973

[54] METHOD AND PACKAGE FOR STORING AND SHIPPING OYSTER LARVAE

[75] Inventor: William W. Budge, Hillsborough, Calif.

[73] Assignee: Pacific Mariculture, Inc., Pescadero, Calif.

[22] Filed: Sept. 14, 1970

[21] Appl. No.: 71,944

[52] U.S. Cl. .................................................. 119/4
[51] Int. Cl. ............................................ A01k 61/00
[58] Field of Search ................................... 119/4, 3, 2

[56] References Cited
UNITED STATES PATENTS

| 149,198 | 3/1874 | Clark | 119/3 |
| 3,526,209 | 9/1970 | Budge et al. | 119/4 |
| 2,989,856 | 6/1961 | Telkes | 119/3 UX |
| 3,194,211 | 7/1965 | Stanek | 119/3 |
| 3,401,671 | 9/1968 | Axelrod et al. | 119/3 X |

Primary Examiner—Hugh R. Chamblee
Attorney—Flehr, Hohbach, Test, Albritton and Herbert

[57] ABSTRACT

Method and package for storing marine larvae, such as oyster larvae, by taking marine larvae at or near the state of metamorphosis and reducing the marine larvae to a temperature substantially below the larval growing temperature to avert metamorphosis for a period of time, and thereafter raising the temperature of the marine larvae to cause metamorphosis to commence.

9 Claims, 4 Drawing Figures

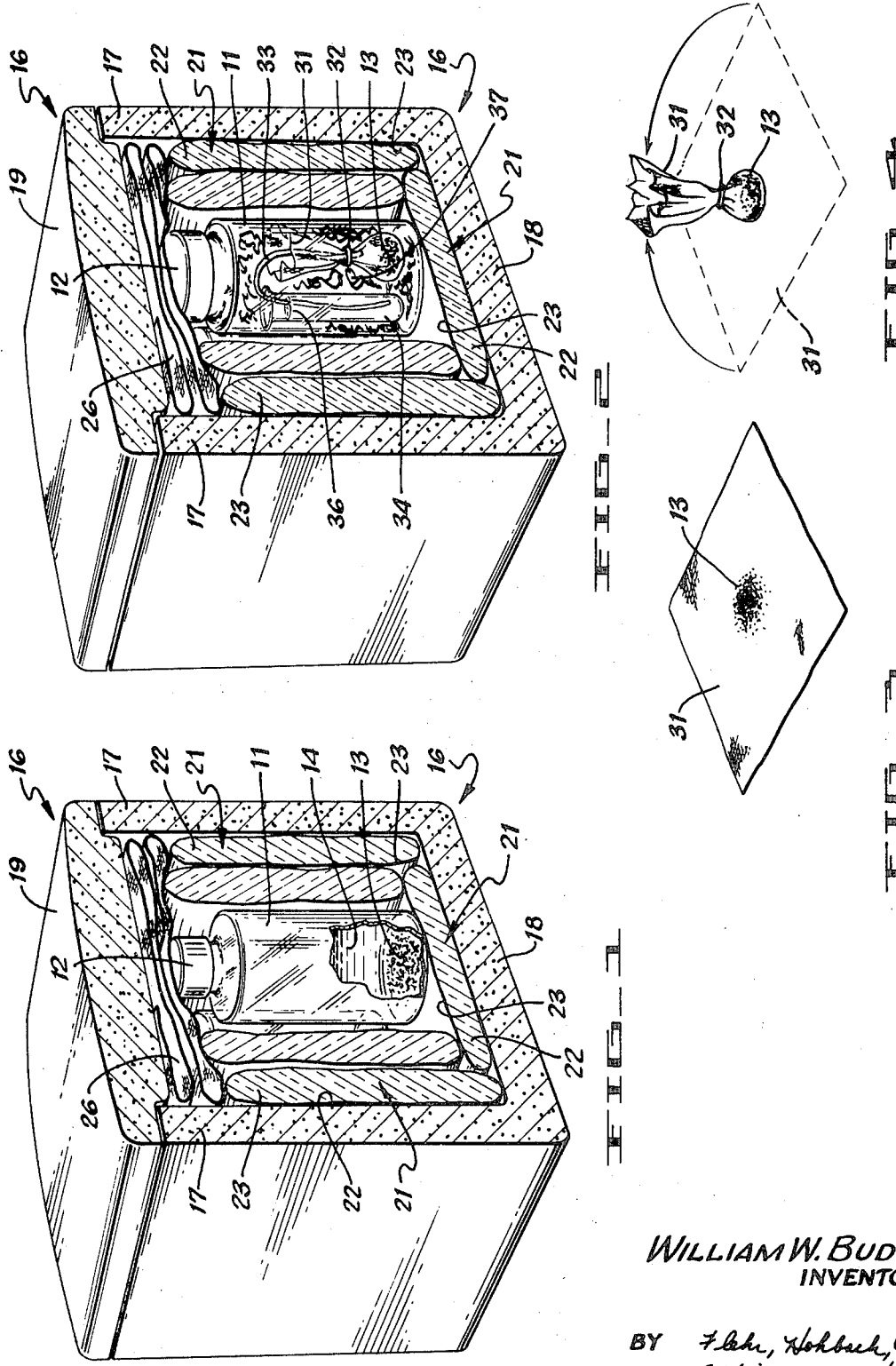

METHOD AND PACKAGE FOR STORING AND SHIPPING OYSTER LARVAE

BACKGROUND OF THE INVENTION

1. Field of the Invention

This invention relates to a method and package for storing oyster larvae for a predetermined period of time and for shipping such oyster larvae.

2. Description of the Prior Art

Heretofore, post larval oyster seed has been shipped from the hatchery to the grower. In some instances, the oyster grower requires that the seed be attached to cultch such as old oyster shell. The seed plus the cultch is a bulky, heavy product which cannot be shipped economically by air. There is, therefore, a need for a new and improved method for getting oyster seed to growers requiring seed attached to cultch material.

SUMMARY OF THE INVENTION AND OBJECTS

The method for storing and shipping marine larvae consists of taking larvae which are at or near the state of metamorphosis and reducing the temperature of the larvae to a temperature which is substantially below the larval growing temperature and a temperature which is at least slightly above freezing to avert metamorphosis of the larvae for a predetermined period of time. A package is provided for maintaining the larvae in this condition so that the larvae can be shipped. When it is desired to utilize the larvae, the temperature of the larvae is raised to cause metamorphosis to commence. The storage or shipping of the larvae can be carried out in sea water or in air.

In general, it is an object of the present invention to provide a method and package for storing and shipping marine larvae.

Another object of the invention is to provide a method of the above character in which the process of metamorphosis in the marine larvae is averted.

Another object of the invention is to provide a method of the above character in which bacterial attack of the marine larvae is greatly reduced.

Another object of the invention is to provide a method of the above character in which large quantities of marine larvae can be stored in a relatively small volume.

Another object of the invention is to provide a method of the above character in which the storing or shipping of the marine larvae can be carried out in or out of sea water.

Another object of the invention is to provide a method of the above character in which metamorphosis of the marine larvae can be readily reestablished, either at the hatchery after storage or at the grower's location after shipment.

Another object of the invention is to provide a method and package of the above character which permits ready shipment of the marine larvae from the hatchery to a grower.

Additional objects and features of the invention appear from the following description in which the preferred embodiments are set forth in detail in conjunction with the accompanying drawing.

BRIEF DESCRIPTION OF THE DRAWING

FIG. 1 is an isometric view of a package partially in cross-section incorporating the present invention and carrying marine larvae processed in accordance with a method incorporating the present invention.

FIG. 2 is an isometric view partially in cross-section of a package incorporating another embodiment of the present invention and carrying marine larvae processed in accordance with a method incorporating another embodiment of the present invention.

FIG. 3 is an isometric view showing marine larvae processed in accordance with the present invention carried by a cloth.

FIG. 4 is an isometric view showing the cloth and larvae of FIG. 3 tied into a bundle.

DESCRIPTION OF THE PREFERRED EMBODIMENTS

Marine larvae such as oyster larvae are processed as described in application Ser. No. 687,069 filed on Nov. 30, 1967, now U.S. Pat. No. 3,526,209, by growing oyster eggs into free swimming oyster larvae in sea water. In accordance with the present invention, slightly prior to metamorphosis of the mature larvae the temperature of the sea water is radically reduced to avert the process of metamorphosis. This is accomplished by observing a body of sea water having a temperature of approximately 30° C. in a vessel, such as a polyethylene tank, in which the mature free swimming oyster larvae are present. As soon as it is ascertained that the first larvae go through metamorphosis by setting as, for example, on the walls of the tank, the sea water containing the larvae is removed in a suitable manner such as by siphoning the sea water containing the larvae onto a screen to remove the larvae from the sea water. While the larvae are on the screen, they are rinsed with cold water having a temperature ranging from slightly above 0° C. to 15° C. This cold water is preferably sterilized by the use of ultra-violet energy and filtered through a one micron filter.

This treatment rapidly reduces the larvae from the conventional growing temperature of 20° C. to 32° C. to a temperature ranging from slightly above freezing or 0° C. to a temperature of 15° C. It has been found that this reduction in temperature prevents metamorphosis from occurring or, in other words, does not permit the setting process of the oyster larvae to occur. In addition, this reduction in temperature greatly reduces the metabolism of the larvae. This, in turn, reduces the oxygen intake of the larvae so that a relatively large number of larvae can be concentrated in a small volume of water without danger of depleting the oxygen supply. Also, the reduced temperature reduces the bacterial activity to thereby greatly reduce larval mortality as a result of bacterial attack.

As explained above, the oyster larvae can be strained from a larger body of sea water and placed in a relatively small body of sea water which has been chilled to the desired temperature. The oyster larvae which have been concentrated in a small quantity of water can then be stored in a suitable refrigerated environment as, for example, in a refrigerator to bring the oyster larvae down to a lower temperature and to retain the desired low temperature. The oyster larvae can thus be retained in a refrigerator until they are ready to be used or to continue processing them through metamorphosis. Alternatively, the oyster larvae can be shipped in a conventional container as, for example, a Dewar vessel.

One apparatus found to be particularly satisfactory for the shipment of oyster larvae is shown in FIG. 1 and consists of a bottle 11 formed of a suitable material such as plastic and which is provided with a large cap 12 which is screwed thereon. The bottle 11 can be of any suitable size as, for example, one capable of holding a liter. The oyster larvae 13 which have been chilled after being strained from the sea water are placed in the bottle and the bottle is filled with sea water which also has been chilled to a low temperature ranging from slightly above freezing as, for example, 2° C. to 15° C. With the bottle completely filled, the cap 12 is threaded onto the bottle. Thus, when the bottle 11 is completely filled with water, it ensures that the oyster larvae 13 are always in contact with the water regardless of the position of the bottle or vessel. This prevents sloshing of the water in the bottle and also prevents the larvae from catching on exposed portions of the bottle. The bottle 11 can then be stored in a refrigerator or other location until the oyster larvae are ready to be processed or shipped.

When the oyster larvae are to be shipped, they can be placed in suitable means for maintaining the temperature slightly above freezing during shipment. As shown in FIG. 1, this can be accomplished by utilizing a chest 16 formed of a suitable material such as polyurethane foam. The chest 16 is of a conventional type and is provided with four side walls 17, a bottom wall 18 and a removable cover 19 for the open top side. A plurality of cold cells 21 are then utilized within the chest and are arranged in such a manner that the bottle 11 is surrounded by the cold cells. For example, as shown in the bottom, one of the cold cells 21 can be provided on the bottom and two cold cells can be provided on each of the four sides. The cold cells are of a type which have a flexible outer envelope 22 formed of a suitable material such as plastic and have a liquid 23 therein which can be frozen in the frozen food compartment of a conventional refrigerator. When they are frozen, they can have the rigid form as shown in FIG. 1. A suitable packing material which also serves as insulation as, for example, a burlap sheet 26 can be used. This serves to hold the bottle 11 in place. The cover 19 can be fastened in place by tape (not shown) or other suitable means.

With the construction shown in FIG. 1, it can readily be seen that the oyster larvae can be transported relatively great distances with little difficulty. For example, a package such as that shown in FIG. 1 could be shipped air freight anywhere in the world.

The use of the cold cells 21 within the chest 16 is advantageous because they ensure that the temperature of the oyster larvae will be maintained close to freezing for long periods but will not be brought below this temperature which would kill substantially all the oyster larvae.

After the oyster larvae have reached their desired location or are ready for use, having been maintained at the desired temperature to maintain the oyster larvae relatively inactive, the oyster larvae can be brought up to a temperature which is near the larval growing temperature of 20° to 32° C. by placing the oyster larvae in a larger body of sea water and gradually bringing the sea water up to the desired larval growing temperature. Alternatively, if desired, the chilled oyster larvae can be placed in a body of sea water which is already at the larval growing temperature. Within a short time, the oyster larvae will resume their life process and will go through metamorphosis and will set in a conventional manner. For example, the setting can be accomplished as described in the copending application Ser. No. 687,069, filed Nov. 30, 1967 now U.S. Pat. No. 3,526,209.

An alternate has been found to shipping or storing of the larvae in chilled sea water. In this alternative method, the oyster larvae 13 are strained from a body of sea water at a larval growing temperature ranging from 20° to 32° C. and placed in a flexible sheet 31 (see FIG. 3) formed of a suitable material such as cotton cloth and which has been saturated with sea water. While keeping the cloth saturated with the sea water as, for example, by dipping one end of the cloth in a small body of sea water and permitting the water to travel through the cloth by capillary action, the oyster larvae were substantially reduced in temperature ranging from a temperature slightly above freezing to approximately 15° C. As in the preceding method, this rapid lowering of the temperature averts metamorphosis of the oyster larvae and also greatly reduces the metabolism of the oyster larvae.

After the oyster larvae have been reduced to a temperature which is near freezing, the ends of the cloth 31 are gathered together to form a bag as shown in FIG. 4, and a tie in the form of a rubber band 32 is placed over the cloth to retain the oyster larvae 13 within the cloth.

The cloth bag containing the oyster larvae 13 is then placed in a bottle 11 of the type hereinbefore described. A wick 33 formed of a suitable material such as cotton has one end inserted into the cloth bag 31 so that it is in contact with the oyster larvae and has the other end extending into a test tube 34 containing sea water 36. A film 37 which does not absorb water, such as a plastic film, is then packed into the bottle 11 to hold the test tube 34 upright. The bottle 11 is then placed in a refrigerator or a package of the type hereinbefore described in conjunction with FIG. 1 to permit shipment of the bottle to remote locations at lowered temperatures. The wick 33 serves to maintain the relative humidity of the atmosphere adjacent to the oyster larvae 13 very close to 100 percent.

When the grower or nursery is ready to use the oyster larvae, it is merely necessary to remove the cloth containing the oyster larvae and to suspend the cloth in sea water at the larval growing temperature of 20° to 32° C. It was found that the setting process quickly commenced.

By way of example, it has been found that it is possible to store oyster larvae up to one week in a vessel such as shown in FIGS. 1 or 2 without any undesired effects.

From the foregoing, it can be seen that oyster larvae can exist at relatively low temperatures only slightly above freezing and that such temperatures avert metamorphosis. However, metamorphosis can be started by placing the oyster larvae in warm sea water ranging from 20° to 32° C. The latter method demonstrates that the oyster larvae can exist out of water at low temperatures where the relative humidity is close to 100 percent. The low temperature reduces the metabolism of the oyster larvae and also greatly arrests bacterial action. With this latter method, there is no danger of oxygen depletion since the oyster larvae are exposed to the atmosphere.

It is apparent from the foregoing that a new and improved method has been provided for the storing and shipping of oyster larvae. The oyster larvae can be stored in the hatchery until they are ready for use. Alternatively, the oyster larvae can be shipped to a grower at remote locations where the grower can utilize the same. The method and packages are relatively inexpensive and are readily usable. They eliminate the necessity for shipping post larval seed attached to heavy, bulky cultch material. Instead, the larvae are shipped without cultch prior to metamorphosis and are set on cultch during metamorphosis at the grower's location. Although the method or process and package have been described primarily in conjunction with oyster growing, the same methods and packages have application to the growing of other marine animals.

I claim:

1. In the method of storing oyster larvae, causing oyster eggs to form into free swimming oyster larvae in sea water, causing the free swimming oyster larvae to grow until they are at or near the state of metamorphosis, reducing the temperature of the free swimming oyster larvae to a temperature substantially below the larval growing temperature to avert metamorphosis in the larvae and storing the larvae at said temperature below the larval growing temperature for a period of time to permit shipment of the oyster larvae before they have reached metamorphosis and before they have attached themselves to cultch.

2. A method as in claim 1 together with the step of thereafter raising the temperature of the oyster larvae to cause metamorphosis of the larvae and their attachment to the cultch to commence.

3. A method as in claim 1 wherein said method is carried out in sea water and wherein said oyster larvae are stored in a reduced volume of sea water.

4. A method as in claim 1 wherein said method is carried out by storing the oyster larvae exposed to air.

5. A method as in claim 1 wherein said oyster larvae are reduced to a temperature ranging from slightly above 0° C. to 15° C.

6. A method as in claim 2 wherein the temperature is raised from 20° to 32° C.

7. A method as in claim 1 together with the step of placing a reduced volume of sea water containing the oyster larvae in a water-tight vessel and retaining the vessel at the reduced temperature.

8. A method as in claim 4 together with the step of placing the oyster larvae in a water-tight vessel having air therein with a relative humidity close to 100 percent.

9. A method as in claim 4 wherein said oyster larvae are disposed in a cloth carried in a water-tight vessel.

* * * * *